Patented May 14, 1929.

1,713,279

UNITED STATES PATENT OFFICE.

THOMAS SLADE GORTON, JR., OF NEW YORK, N. Y.

FISH COMPOUND.

No Drawing. Application filed March 13, 1925. Serial No. 15,364.

My invention relates to food compounds, and more particularly to a combination of fish of certain characteristics hereinafter described, with crab or lobster and their natural liquor, and the process by which the same are compounded or blended together.

An object of my invention is to produce a food mixture which has the characteristic taste of crab or lobster, as the case may be, and the ordinarily observed appearance of those respective sea foods, but which contains a relatively large proportion of fish content.

Another object of my invention is to produce a wholesome food that closely simulates or completely acquires the crab or the lobster flavor, at a cost appreciably less than either of those sea food elements alone.

A still further object is to produce canned crab or lobster meat reinforced by flakes of fish flesh, which assume the outward appearance of the crab or lobster, with little or no loss of the flavor thereof.

Further objects will appear from the description hereinafter contained.

It is well known that lobster and crab meat are considered table delicacies or luxuries in a sense and to a degree not applicable to most of the fish foods of commerce. Furthermore, these delicacies are considered expensive, compared to the cost of many of the well known varieties of fish.

On the other hand, there are certain types of food fish which when cooked possess a negligible flavor and which while possessing high food value are relatively inexpensive, especially in comparison with the cost of either lobster or crab meat.

Accordingly I combine the comparatively tasteless haddock, hake, cod or some other of the so called cod family of food fishes, with crab or lobster, in a manner and in the proportions hereinafter described with a resulting compound that conserves to a controlling degree the flavor of crab or lobster, as used. Not only can the taste of the crab or lobster be thus extended to certain fish foods, but when cooked, the flesh of most of these types of fish breaks up into flakes which by my process are made largely to resemble lobster and crab meats in appearance.

For the purpose of this specification and with a view to brevity I shall first describe in detail the process and product relative to haddock prepared with crab meat and liquor, pointing out in what manner and to what extent these differ when other component meats are employed.

My product is entirely intended for canning purposes, and to this end the crabs are prepared in the usual way, and for the sake of convenience in subsequently apportioning the parts to enter the compounded food of my invention, the liquor is separated from the meat of the crab.

The initial step of my improved process comprises the treatment of the crabs, which are boiled and steamed in the shell for a period approximating fifteen minutes. The steaming of the crabs may be more conveniently performed at or near the localities where taken from their natural environment, after which the cooked crab meat may be shipped to more convenient quarters for completing the process of my invention. The haddock, uncooked, is then combined with the cooked crab meat, in the due proportions required, and canned; the cans are thereupon sealed and with contents steamed or cooked for approximately an hour and a half to complete the finished product.

The proportions of the ingredients employed are ascertained by weight, and I have found the best results commercially and in the matter of taste and personal satisfaction are to be had from the following proportions, forming my improved sea food compound, to wit: 20% crab meat, 15% crab liquor, and 65% haddock flakes, and after thoroughly mixing the ingredients the compound which they form is hermetically sealed in cans and steamed in the cans for approximately ninety minutes.

For all combinations I prefer to maintain the proportion of crab juice at fifteen per cent of the whole, but of course this may be varied, with the knowledge that the crab flavor will vary correspondingly.

The combining proportion of crab meat may also be increased or decreased with attendant modification of crab flavor, but if the liquor content as above specified be retained, then the crab meat may be used in substantially reduced quantities without too great loss of crab flavor, even to the point of its actual omission from the compound.

Thus if 25% of crab meat and 60% of haddock be cooked with 15% of crab liquor, the mixture will not be distinguished by the average person from exclusive crab products if judged from taste alone.

Therefore, in furnishing a dish of crab meat, the inclusion of a greater proportion than twenty-five per cent of crab meat would be unnecessary; and should upwards of 50% of crab meat be introduced into the compound, no practical advantage in price would be gained.

On the other hand, I desire to point out that by retaining substantially the 15% of crab liquor, the crab meat content may be reduced to as low as 5% or even less, and retain definite crab charactertistics in the compound thus made up, when the flesh of haddock or similarly low flavored food fish is used. Furthermore, the flavor imparting element being almost wholly contributed by the juice of the crustacean, its meat may be, as already seen, eliminated altogether, with substantially the same result to the product as if the crustacean meat were added.

The employment of fish other than haddock will be controlled by matters of expediency and availability, for as far as the taste or food value of my compound is involved, the cod, hake, cusk, pollack or any of that general class of food fish may be employed with the crab contents as set forth, with substantially identical results in all important particulars, excepting that when hake is cooked for canning, the meat flakes are lost and merely to the extent of the difference of its appearance is noticetble when combined with crab or lobster flakes.

My process and product have thus far been described more in detail in connection with crab ingredients. When using lobster, because of the lower flavoring value, a larger portion of the meat is employed to obtain the same general result, namely, to bring the compounded food to simulate more closely if not entirely the taste and appearance of lobster.

Having described my invention, what I claim is:

1. A method of preparing sea food wherein crab meat and crab liquor are first steamed or cooked, then combined with flaked haddock, raw, and the compound sealed in cans and submitted to steam heat until the haddock is cooked.

2. A method of preparing sea food in cans which comprises the following steps; first, a predetermined number of crabs in the shell are steamed for approximately fifteen minutes; then the meat is removed from the shell and the crab meat and liquor are combined in predetermined proportions with haddock flakes; the compound thus formed is hermetically sealed in cans; and finally the product thus compounded is steamed in the said cans for approximately ninety minutes.

3. A compounded sea food comprising food fish of a relatively weak flavor with meat and liquor of food crustaceans having relatively strong flavor, wherein the stronger flavor permeates the entire mixture.

4. A compounded seat food comprising crab meat, crab juice and haddock flakes in predetermined quantities.

5. A compounded sea food comprising food fish of a relatively weak flavor with the liquor of food crustaceans having relatively strong flavor, wherein the stronger flavor permeates the entire mixture.

6. A compounded sea food comprising crab juice and haddock flakes in predetermined quantities.

In testimony whereof I have hereunto set my hand.

THOMAS SLADE GORTON, Jr.